United States Patent [19]

Meschi

[11] Patent Number: 5,173,935
[45] Date of Patent: Dec. 22, 1992

[54] METHOD, SYSTEM AND APPARATUS FOR TELEPRINTING

[75] Inventor: Luciano Meschi, Castiglioncello, Italy

[73] Assignee: Industria Grafica Meschi S.r.l., Livorno, Italy

[21] Appl. No.: 328,967

[22] Filed: Mar. 27, 1989

[30] Foreign Application Priority Data

Mar. 31, 1988 [IT] Italy .............................. 20048 A/88

[51] Int. Cl.$^5$ ........................................... H04M 11/00
[52] U.S. Cl. .................................... 379/98; 379/106; 379/107
[58] Field of Search ........................ 329/107, 106, 91; 364/464.02; 379/98

[56] References Cited

U.S. PATENT DOCUMENTS

| | | | |
|---|---|---|---|
| 4,086,434 | 4/1978 | Bocchi | 379/97 |
| 4,800,504 | 1/1989 | Durst, Jr. et al. | 364/464.02 |
| 4,800,506 | 1/1989 | Axelrod et al. | 364/464.02 |
| 4,811,011 | 3/1989 | Sollinger | 379/107 |
| 4,811,234 | 3/1989 | Storace | 379/107 |
| 4,821,195 | 4/1989 | Baer et al. | 379/107 |
| 4,833,618 | 5/1989 | Verma et al. | 379/107 |
| 4,849,884 | 7/1989 | Axelrod et al. | 364/464.02 |
| 4,853,864 | 8/1989 | Hart et al. | 364/464.02 |
| 4,853,865 | 8/1989 | Sansone | 364/464.02 |
| 5,007,084 | 4/1991 | Materna et al. | 379/93 |

OTHER PUBLICATIONS

Review of Electr. Comm Lab., vol. 29, No. 7/8, Jul.-Aug. 1981; pp. 663-679, Tokyo, Japan; H. Takeda et al.

Commutation et Electronique, No. 51, Oct. 1975, pp. 67-88, Issy-des-Moulineaux, France; Ch. Carrouge et al.

Japan Telecommunications Review, vol. 25, No. 4, Oct. 1983, pp. 288-292; K. Ono et al.

*Primary Examiner*—James L. Dwyer
*Assistant Examiner*—Stella L. Woo
*Attorney, Agent, or Firm*—McAulay Fisher Nissen Goldberg & Kiel

[57] ABSTRACT

Teleprinting system, at a telephone user, comprising an apparatus containing a microprocessor corrected to a telephone line through a modem unit providing to distinguish data transmission messages from standard telephone messages using differences in the ring signal to send the received data to a printer, to a display, or through an interface circuit to an outer computer, and receiving messages from an optical reader or from a keyboard for their transmission through the modem unit to the corresponding apparatus of an agency or individual connected in order to embody the interaction, and is particularly applicable to telebilling or teleinvoicing methods from service agencies to an end user.

19 Claims, 7 Drawing Sheets

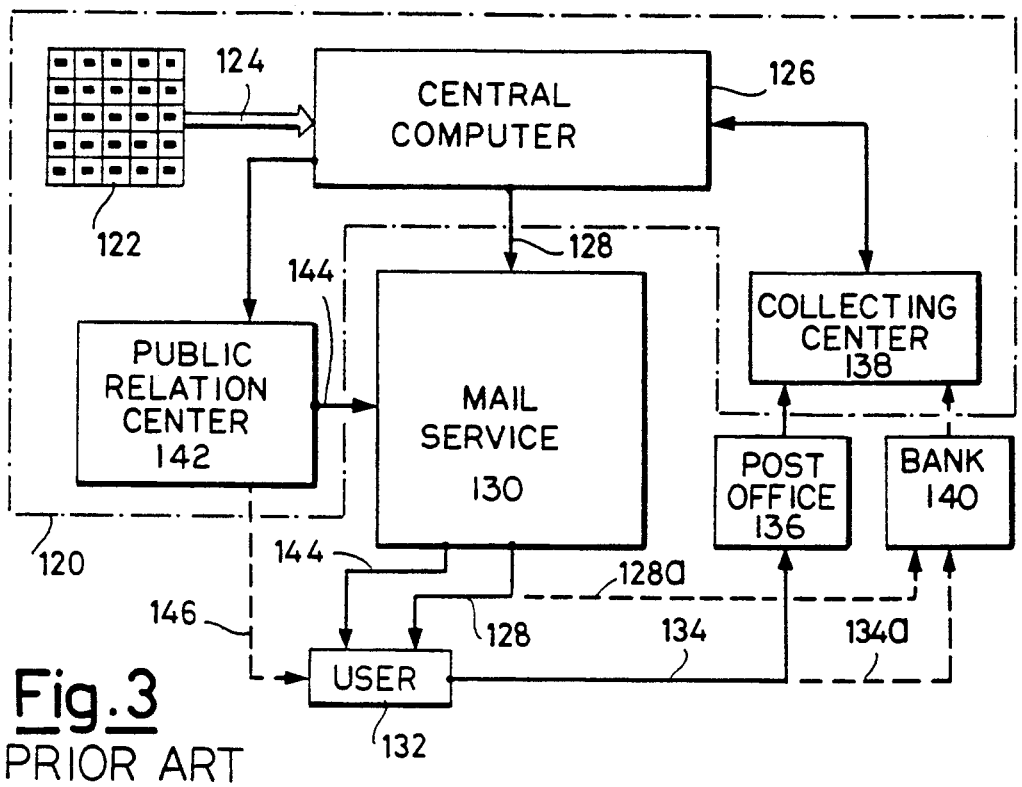
Fig.3 PRIOR ART
Fig.4
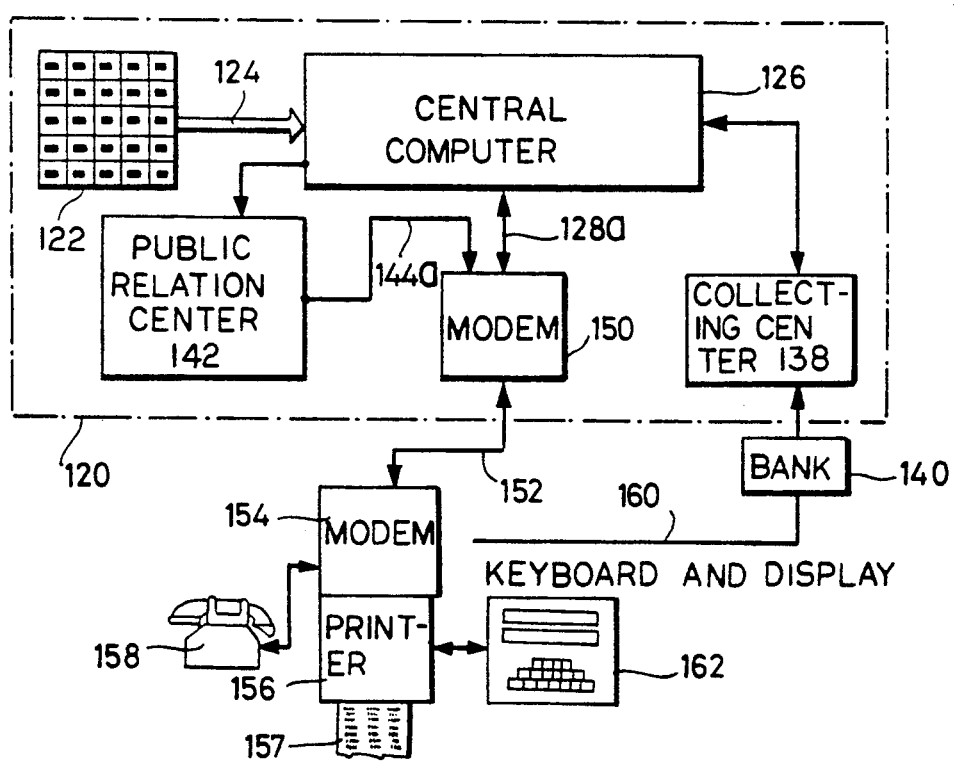

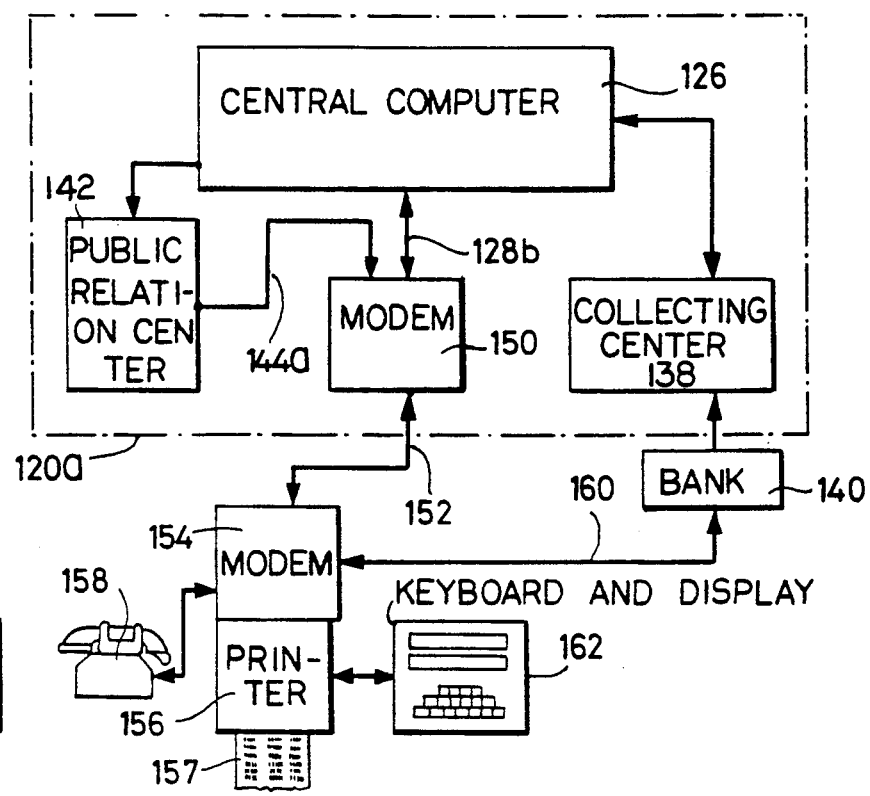
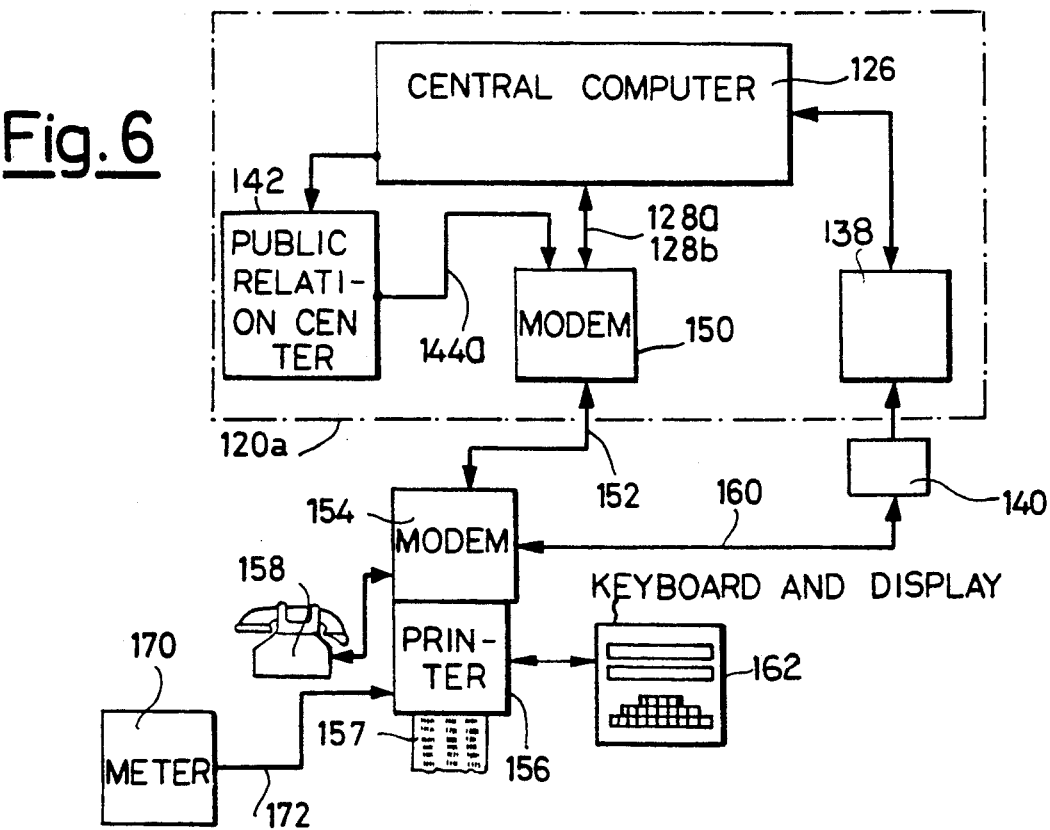

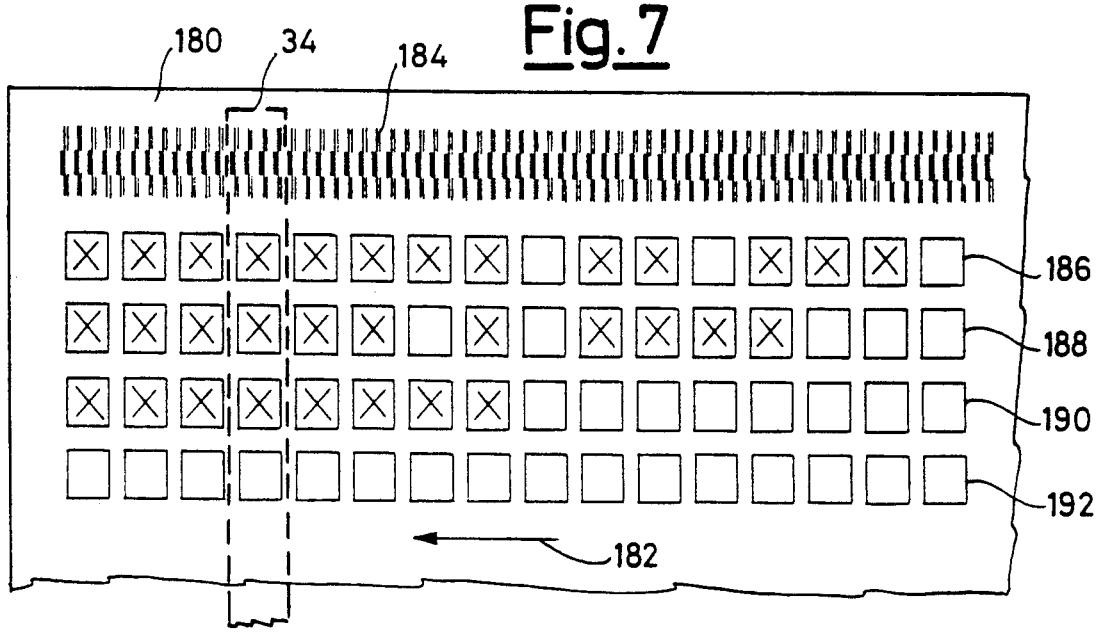
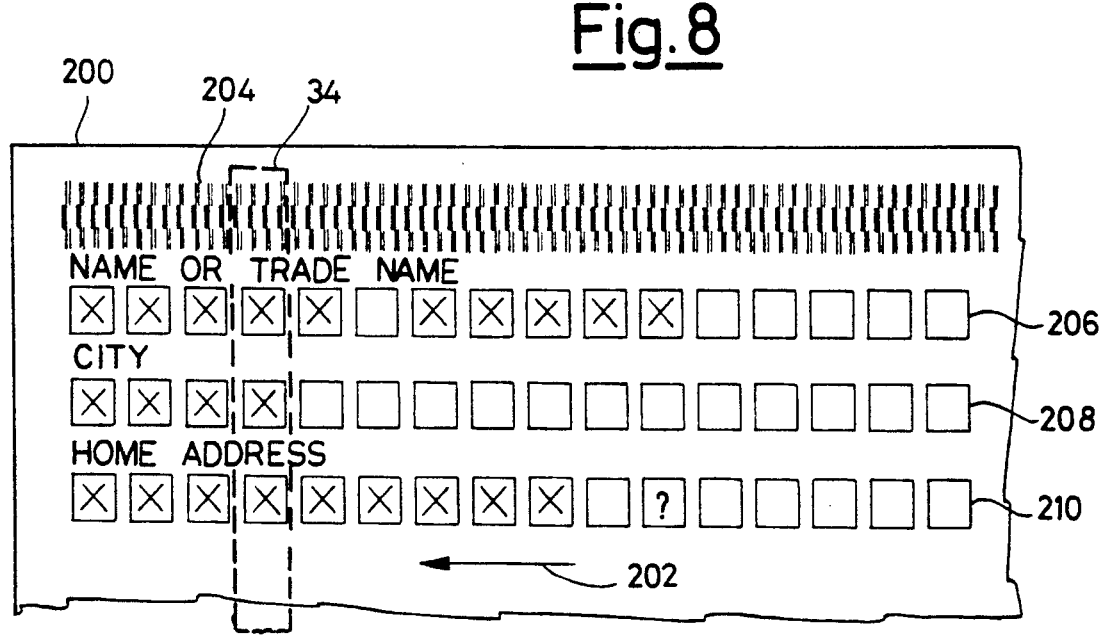

METHOD, SYSTEM AND APPARATUS FOR TELEPRINTING

BACKGROUND OF THE INVENTION

The present invention relates to a system and an apparatus to allow data and messages to be printed or written onto a paper support or the like. Also is an answer back or interaction. The data and messages serve for the delivery of bills or invoices, for interpersonal communications or for requesting and supplying information between an agency and an individual user or between users.

At the present time the agencies supplying products or services to the public request the payment of said products or services through a network formed by one's own bureaucratic organization, based on internal personnel, and through external organizations, such as mail delivery services and money collecting services like mail and/or bank services.

Among these agencies, those which are enabled to keep the measurement means of the products or services at their premises, in order to obtain data from which the bills, to be sent to the users, can be deduced, do not face particular difficulties apart from using a great deal of personnel for the preparation of said bills and from being compelled to make recourse to mail delivery services (such as mail services and delivery services) with all the possible drawbacks such as delays and/or miscarriages of mail as caused by these services.

The agencies which, owing to the nature of the services being supplied, such as the agencies distributing electricity, gas, tap water etc., are compelled to maintain the meter at the user's house, suffer from the further drawback of being compelled to use personnel attending to the meter reading, in order to periodically read the meters and obtain the data from which the bills to be sent to the users are drawn.

As for budget reasons said agencies have a limited number of employees attending to the meter reading, said readings are carried out at rather long time intervals, of about four to six months, whereas for financial reasons it is convenient and desirable to bill the sums for the services rendered every two months, mainly to avoid an excessive financial exposure and to keep the amounts of the single bills within reasonable limits.

However, in order to effect a billing every two months, against a reading of the effective consumption every four or six months, invoices are to be issued on alleged consumptions which, although well calculated, are based both on general statistical data for each category of user and on historical consumption data of each user, may give place to a number of rather troublesome problems, such as the alternation of bills of too many different amounts, the obligation of reimbursements to a user after a number of too high amount bills with respect to the effective consumptions, misunderstandings owing to the sudden stopping of the service supply etc.

Moreover the jurisprudence of several countries is oriented to consider as invalid the bills issued for presumptive consumptions, whereby a number of agencies may be exposed to objections about the legal basis of these bills.

OBJECTS AND SUMMARY OF THE INVENTION

One object of the present invention is to provide through a teleprinting apparatus at a telephone user information coming from public service agencies or the like, mainly relating to the amounts of bills which the user has to pay for a service supplied by one of said agencies. Another object of the present invention is that of providing an apparatus, to be installed at a phone set, to obtain thereat a printing of billing data both on a simple paper support and on forms suitable for carrying out payment of bills at money payment services, such as post offices or bank offices.

A further object of the present invention is to provide an apparatus, to be installed at a telephone set, provided with displaying optical means in order reproduce in a nonpermanent manner information and messages for the user, coming from an agency or another user. Another object of the present invention is to provide an apparatus, to be installed at a telephone set, provided with transmission means for a printed message, such as an alpha-numeric key board, permitting the user to send messages to an agency or to another user.

A further object of the present invention is to provide an apparatus, to be installed at a telephone set, provided with an optical-electronic reading means, adapted to read messages written on special forms to permit communication with other users or with agencies for sending instructions or for asking for information.

Another object of the invention is to provide an apparatus to be installed at a telephone user, provided with interface and connection means with an outer computer (personal computer) owned by the user, in order to permit communication between said personal computer and one of said agencies (especially with the computer machine of said agency) as well as between personal computers of different users.

Another object of the present invention is to provide an apparatus to be installed at an user, provided with reading and interfacing means for meters of products or services, installed at the user, in order to permit a telereading of said meters by the agencies supplying the product or services.

To these ends, the invention consists in a method of periodically transmitting billing data to a user of a meter for measuring service and for allowing the user to control and pay the bill to a supplier of the service, and the steps comprise collecting service data referred to a service utilized by a user from a user meter to a central processor installed at a supplier location and storing the service data in a memory of the central processor; processing the service data and a corresponding service rate for the service data stored in the memory of the central processor to obtain a service charge related to a given period of time, including additional charges and taxes; assembling the service data, service rate and service charge with all other data related to the user and stored in the memory of the central processor and intended to be shown in a bill; periodically sending the assembled data related to the user from the central process to a remote processor installed at the user location and storing the data in a memory of the remote processor, the assembled data being sent through a communication line; sending a command from the central processor to the remote processor through the communication line for printing the data stored in said remote processor on a blank bill form available to the user at the supplier location; and printing the blank bill form supplied by the user to a printing machine, the resulting bill form being the document allowing the user to control the billed data and carry out payment for the service received.

The inventive method additionally includes performing operations of collecting and storing the service data in the central processor through the communication line connecting the central processor with said remote processor in which are stored the service data coming from the meter user. The operations of collecting and storing the service data in the central processor are periodically carried out.

Messages are also sent from the central processor to the remote processor, through the communication line, for signalling inaccuracies of the payment to the user and advices for remedies. Messages are also sent from the remote processor to the central processor, through the communication line, for requesting information, explanations and corrections of at least part of the assembled data.

Briefly stated, the present invention is also concerned with an apparatus for carrying out the method and essentially comprising a microprocessor (12) and a modulating-demodulating system (14) commonly known as a "modem" connecting a telephone line (16) to said microprocessor (12) or to a standard telephone set (18) according to the type of ring signal received by said "modem" (14), wherein the microprocessor (12) is enabled to distinguish a ring signal for conversations from a ring signal for a data transmission on the basis of some distinguishing parameters, such as for example the time duration of the first ring signal, by connecting the telephone line to the telephone set (18) or to the microprocessor (12), said microprocessor (12) attending to the acknowledgement of the received data, distinguishing between valid or legal data for which an action is carried out and non valid or illegal data for which no action is carried out apart from warming about their illegality.

Specifically, when said microprocessor (12) receives a first valid or legal data, they are recorded on, thereafter a second, a third, a fourth data or waited for etc. and finally upon the arrival of a signal of end of transmission, the microprocessor checks whether the data are transmitted with a redundant code mechanism, suitable to avoid loss of information, sending an answer of non accepted data if said code is not present and an answer of accepted data if it is present, carrying out the commands subsequently, considered legals, and transmitted with redundant code and lastly maintaining the procedure until a release signal arrives which through "modem" (14) disconnects the microprocessor (12) from the telephone line (16).

More specifically, said microprocessor (12) according to legal data received, provides a drive for one of the peripheral units, connected thereto, such as a printer (22) or a display (38).

Alternatively, said microprocessor (12) according to legal data received, provides to connect the line (16) with the interface (30) of a personal computer at the user station.

According to another preferred embodiment, the microprocessor (12) controls the "modem" (14) to permit a transmission of an answer or interaction from the user to an agency or another user.

More specifically said answer can be provided by a key board peripheral unit (42) for composing and sending messages.

Alternatively, said answer may be provided by a peripheral unit provided with optical reader (34) for reading messages written onto proper forms (180;200) provided with a pre-market zone (184;204) for providing speed data for said forms in order to generate signals for the synchronization of characters written in aligned boxes according to suitable lines (186;192-206;210).

Alternatively, said pre-market zone (184;204), providing reading date, can be replaced with wheels pulled by the sheets of said forms (180;200) and driving generators of synchronization signals.

According to a further alternative, said optical reader (34) can be used for sending messages of personal communication to other users or a request of information from agencies and for providing an answer to a request from an agency.

A method of utilization of the present invention which can be used to provide for invoicing and payments of services which can be metered by a meter according to which an agency (120) provides for the transmission of reading data of meters relating the measurement of products or services supplied to each single user to an accounting computer of the agency, (126) sends through a telephone line (152) a billing message to each user having an apparatus according to the present invention, said apparatus comprising a receiving "modem" (154) and a computing and printing unit (156) to print the billing data onto a form (157) useful to carry out a payment of bills using one of the standard means for said payment.

According to a preferred embodiment, the payment means is a post office account payment carried out by using the form (157) with the data issued by the computing and printing unit (156).

According to another embodiment, said payment means is a remittance at a bank service using the same form (157) with the data issued by the computing and printing unit (156) in a manner useful for a bank remittance. Alternatively, the data written by the computing and printing unit (156) at the user may be used to send through whatever means of data transmission, directions (160) to a bank agency (140) which takes care of bill payment.

More particularly, the directions (160) can be composed by means of a key board and display assembly (162) and sent to said bank agency (140) through a telephone line using said computing and printing unit (156) and said "modem" (154).

Alternatively, the directions (160) can be written onto a communication form (180) to be read by an opticall reader (34) connected to the apparatus at the user.

The present method in order to permit the billing and payment of product and services which can be metered by a meter uses meters (122) present at said agency (120) which supply to said accounting computer (126) the data for the composition of billing messages to be sent to the computing and printing unit (156) at the user for the printing of bills and/or forms to be used for the payment of billed amounts.

Moreover the accounting computer (126) at the agency (120) may send to said user special directions (144a) such as limiting commands or suspending services owing to particular situations, such as non-payment of bills.

Alternatively the meters, (170) can be present at the user and an accounting computer (126) at the supply agency (120a) may send to the user periodical directions (128b) to read said meters (170) and transmitt the reading data to said agency (120a), said accounting computer taking then care of sending billing data suitable for the printing of bills and/or payment forms by means of the computing and printing unit (156) at the user.

According to another alternative, the meters (170) at the user can be read directly by the accounting computer (126) of the same agency (120a) through optical readers present in said meters and periodically actuated by said accounting computer (126) through an interface (172) between said meters (170) and said computing and printing unit (156) at the user. In addition the computer (126) at the agency (120a) may send to said user special directions (144a) such as commands of limitation or suspension of service owing to particular situations such as omitted payments of bills.

BRIEF DESCRIPTION OF THE DRAWINGS

The features and advantages of the present invention shall be made more evident from the description of the preferred embodiment thereof given as an example and provided with the enclosed drawings in which:

FIG. 3 is a schematic diagram of a system for service billing such as a telephone service, carried out according to the prior art means;

FIG. 4 is a schematic diagram of a billing system, similar to that of FIG. 3, carried out with the apparatus of the system according to the present invention;

FIG. 5 is a schematic diagram of a billing system for a service, the metering device of which, such as a meter, is installed at the user and can be read by the same, FIG. 6 is a schematic diagram of a billing system, similar to that of FIG. 5, in which moreover the meter can be directly read from the apparatus by means an interface system with the same;

FIG. 7 is a schematic picture of a form for message transmission which can be read by means of reading an auxiliary device which can be applied to the apparatus of the present invention;

FIG. 8 is a schematic picture of a form for information request to agencies or organizations open to the public, which can be read by means of the same auxiliary reading device used for reading the form of FIG. 7.

DETAILED DESCRIPTION OF THE PREFERRED EMBODIMENTS

Figure 1:
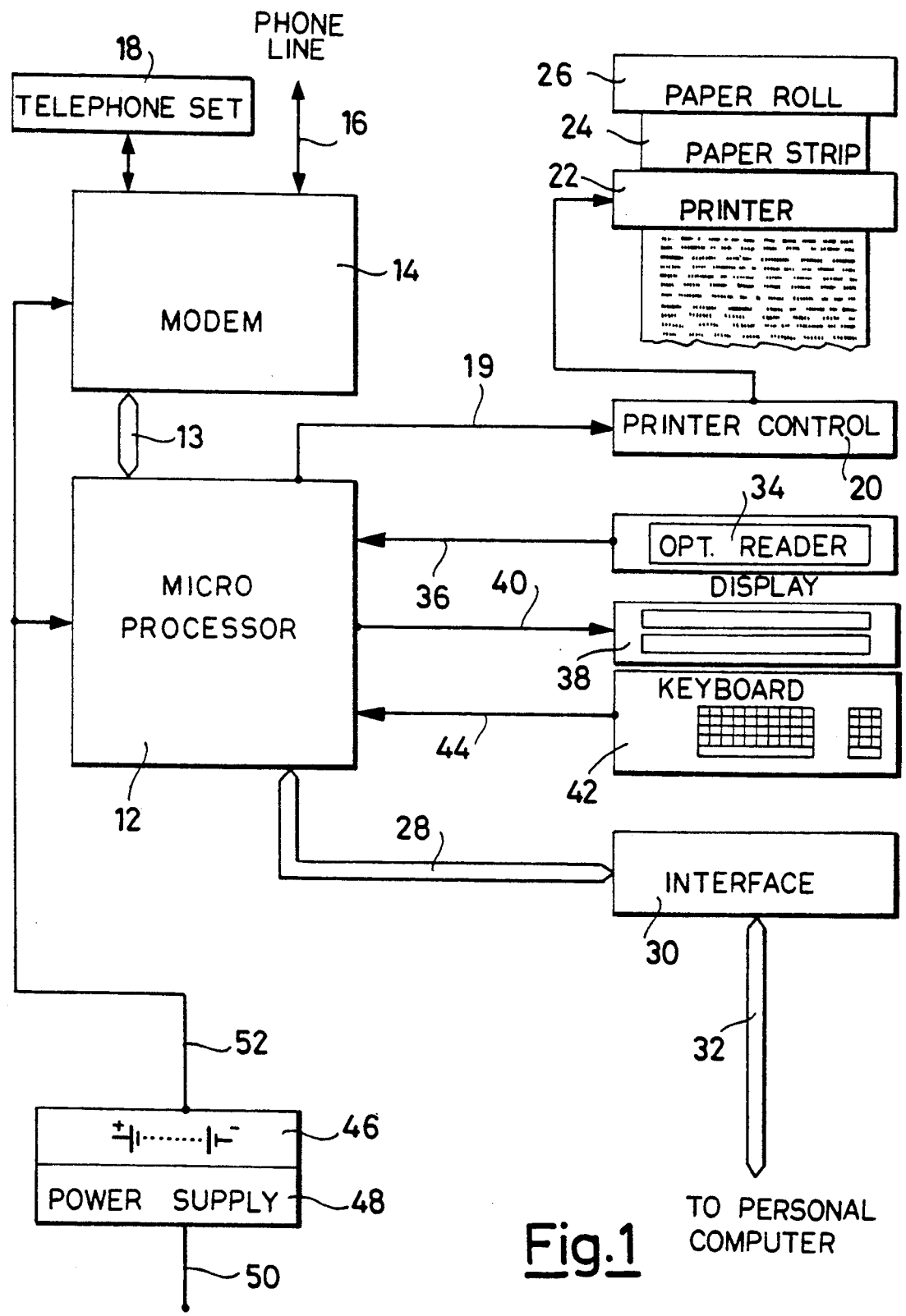
FIG. 1 is a block diagram of an apparatus embodying the system according to the present invention.

Referring to FIG. 1, it is seen that an apparatus embodying the system according to the invention consists of a microprocessor 12 connected by a multiple line 13 to a modulating and demodulating device 14 hereinafter called "modem" which provides the interface between a telephone line 16 and said microprocessor 12 as well as with a telephone set 18.

Said microprocessor 12 is also connected through a line 19 and a control apparatus 20 to a printer 22 which, for example, carries out the printing onto a paper strip 24 which is unrolled from a roll or suitable cartridge 26. Said paper strip 24 can be a continuous strip of white paper or a series of pre-printed forms, connected to each other by weakened regions to permit their subsequent detatchment, of the type of forms to be used for mail or office account payments.

Said microprocessor 12 is also connected through a multiple line 28 to an interface circuit 30 for the further connection through the line 32 to an outer computer such as a personal computer (not shown).

To said microprocessor 12 it is also possible to connect an optical reader 34, through a line 36, a display 38 through a line 40, and a keyboard 42 through a line 44.

A buffer battery 46, mantained charged by a power supply 48 connected to a main line 50, supplies through a reserved line 52, the microprocessor 12 and the "modem" 14 to retain data and prevent an interruption of a possible connection in case of lack of main power.

For microprocessor 12 a number of commercially available microprocessors can be used.

However it is particularly preferred in the present embodiment to use as a microprocessor Toshiba TMP 84C 015 which has the advantage of integrating on the same "chip" also some peripheral components such as four timers, two adaptors for synchronous or asynchronous serial interface, two adaptors for 8 bit parallel interface and a so called watch dog timer. Of course, to the microprocessor are connected and commonly supplied all the electronic components necessary for the operation thereof, such as for example electrically programmable read only memories (EPROM), random access memories (RAM), quartz oscillators, decoding circuits, etc.

As a printer 22, one of a number of presently commercially available printers can be used, with the only limitation imposed by the size and by the possibility of interface and by power requirements of the printing member, possibly requiring supplementary drivers or buffers.

More specifically in the present embodiment a printer EPSON 3740 has been used, provided with its own control circuit which facilitates the task of the microprocessor 12 in carrying out prints.

However said control circuit can be eliminated by having its function carried out by the microprocessor 12 itself, using supplementary drivers or buffers. Also the "modem" 14 can be selected among several available "modem" types, the only limitation being that said "modem" must be controlled from one of the serial adptors (gates) of the microprocessor 12.

Said "modem" is expected to acknowledge a ring signal or "ring" with features different from the normal ring coming from telephone calls among normal users of the telephone service.

For example this ring can be of a different time duration with respect to the first ring or ring signal coming from a usual commutator and the system is then arranged for filtering the first ring preventing the ring signal for the apparatus from actuating the telephone ringing bell, from which the user would be disturbed with calls directed not to telephone communication but to communication with the apparatus of the present invention which consequently are of interest only for the "modem".

Figure 2A:
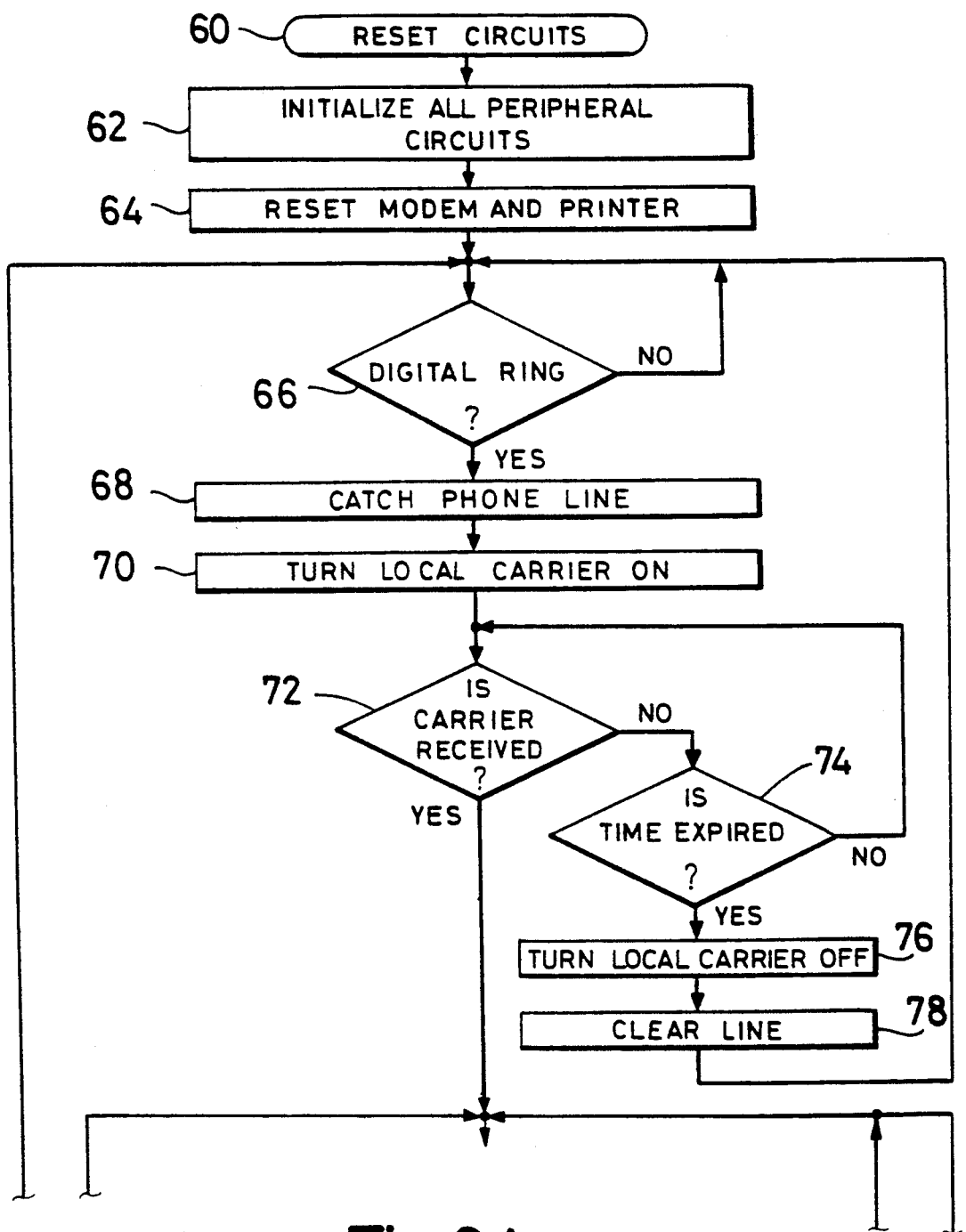
FIG. 2A is a first portion of a flow chart for the "modem" portion of an apparatus embodying the system according to the present invention.
Figure 2B:
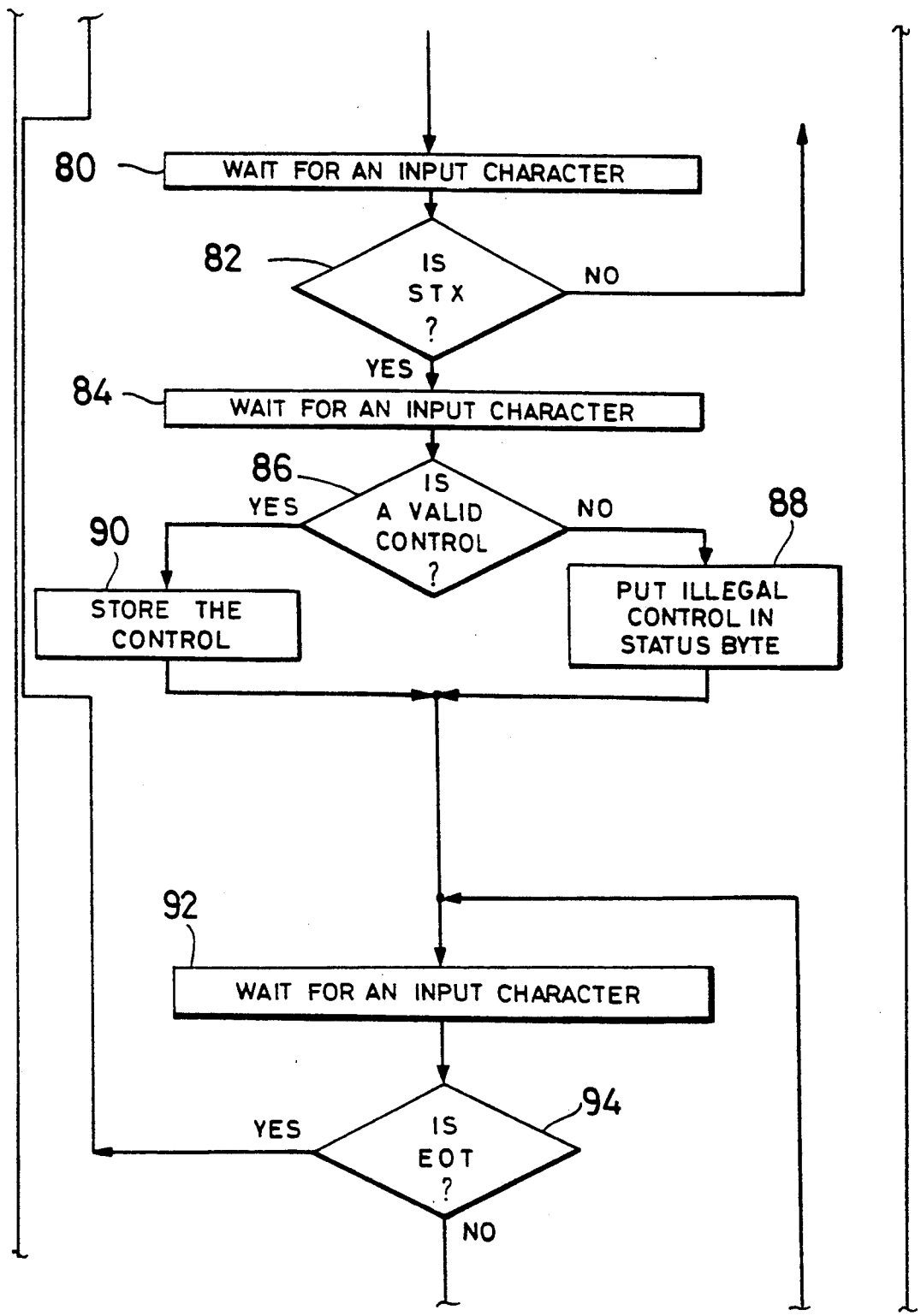
FIG. 2B is a second part of the same flow chart, the first one being depicted in FIG. 2A.
Figure 2C:
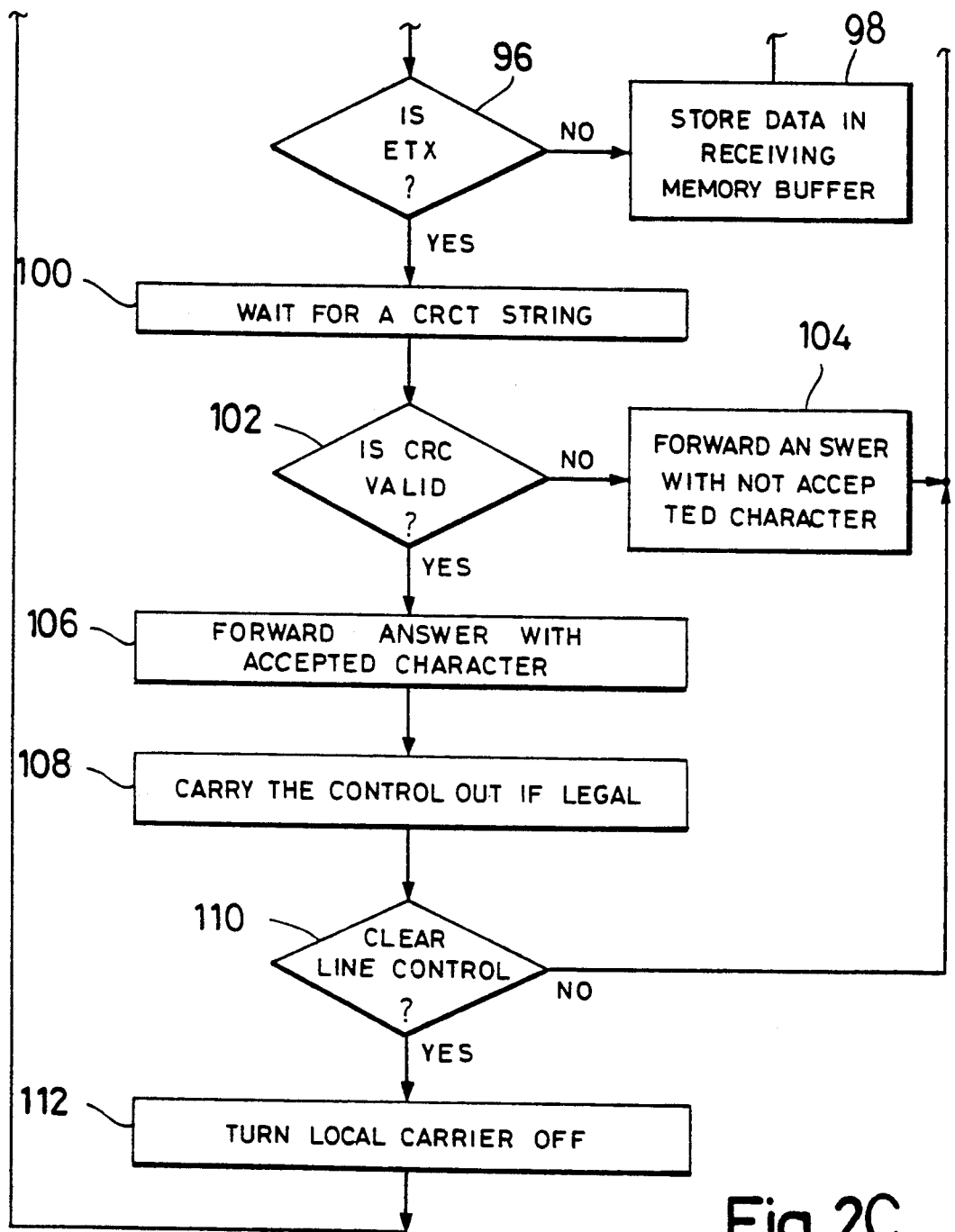
FIG. 2C is a third part of the same flow chart, the first and second parts being depicted in FIGS. 2A and 2B

For example and to understand the operation of said "modem" reference is made to the flow chart depicted in the FIGS. 2A and 2B.

Said flow chart permits the "modem" to be connected to the telephone line when a ring signal or ring of the type indicating a call for data transmission and not for telephone conversation, for receiving data, for carrying out valid command and for releasing the line at the end of the transmission, is received.

Among the commands accepted by the system of the present invention the following, for example, can be present:
(a) diagnostics, such as: indication of paper reserve in the container or cartridge 26, printing property, bills taken out by the client, etc.
(b) memory initialization;
(c) data reception for printing postal account forms;
(d) data reception for messages or bills;
(e) printing commands;
(f) line release.

The carrying out of the tasks of the "modem" is illustrated in a detailed manner in the flow chart of the FIGS. 2A and 2B and particularly: the swtiching on of the apparatus resets all the resettable circuits, as illustrated in the starting block 60, causes the starting of the circuit of all the peripheral units and resets the "modem" 14 and the printer 22 bringing the head thereof in the normal starting position, as illustrated in the action blocks 62 and 64 respectively.

The arrival of a ring signal causes the length thereof to be evaulated by deciding through the decision block 66 whether it is the call for data transmission, or digital ring, or a normal call for telephone communication.

If the decision is that it is not a digital ring, the program comes back, immediately after to the block 64, otherwise it shifts to the action block 68 which causes the line to be engaged, namely the telephone line 16 is connected to the "modem" 14 and thus to the block 70 by which a local carrier signal is switched on permitting data transmission.

The next decision block 72 makes the decision whether the local carrier is received. If it is not received, a second decision block 74 checks whether a waiting time is not lapsed. Until said waiting time is not lapsed a return to the block 72 takes place to possibly permit the operation in the case of carrier reception.

When said time is lapsed, an action block 76 switches off the local carrier signal and a next block 78 releases the line by disconnecting it from the "modem" and making it available for the normal telephone calls. In the case in which the local carrier is received (affirmative answer to the decision block 72) the action of the block 80 is adopted namely to wait for an input character. A next decision block 82 evaluates whether said inlet character is a character of transmission starting.

If it is not the case, a return takes place to the waiting block 80, whereas if it is a transmission starting character a waiting block 84 is enabled for a second input character.

A decision block 86 indicates if the arrived command is a valid or not valid command, if it is not valid, said non valid or illegal command is placed in status byte in the block 88 and then discharged. If it is a valid command, it is recorded in the block 90.

Whichever is the destiny of the previous command, the "modem" is shifted to wait for a next inlet character as indicated by the action block 92. After this action in the decision block 94 it is assessed whether the time is lapsed.

If the time is lapsed, a return takes place to the block 80 to wait for a next inlet character; if it is not lapsed, in the decision block 96 it is checked whether the transmission is ended. If it is not ended, the data are saved in an auxiliary memory or "receiving buffer" within the block 98 and a return takes place to the block 92 to wait for another inlet character.

If it is ended a string is awaited for carrying a redundant transmission code in the action block 100. By means of the decision block 102 it is checked whether the redunant code is valid. If it is not valid, an answer is sent with the non-accepted character, according to the block 104 and the system returns to wait for an input character to the block 80. If it is valid, an answer is started with the accepted character according to the block 106 and the command is carried out, if legal, according to the block 108. At that point a decision block 110 thus verifies whether the command is that of releasing the telephone line. If it is not so, the procedure comes back to the block 80 for waiting for an input character and the procedure is repeated from that point. If it is so, in the block 112 the switching off of the local carrier and the releasing of the telephone line 16 from the "modem" 14 are carried out and the procedure is placed in waiting list to evaluate through the decision block 66 whether the next ring signal is a digital ring or a normal call for telephone conversation.

Reference is now made to the FIGS. 3 to 6 to understand how the system and the apparatus according to the present invention may operate in their essential version.

The example is considered as an actual reading and billing system of a service such as the telephone service. In this connection within the organization of an agency 120 for instance paying the telephone service, a plurality 122 of unit counters is present which are connected by an interface system 124 with a central computer 126 of the agency by which there are periodically calculated bills 128 to be sent through a mail delivery service 130 to each user 132, said bills 128 usually comprising a sheet bearing the billing data joined to a payment form by means, for example, of a post office account.

The user 132 takes the portion 134 of the postal account form, contained in the bill 128, and takes care of the payment through a postal office 136, which postal office 136 informs a collecting center 138 of the agency 120 about the payment which took place whereby the central computer 126 may have notice of the paid bills. Alternatively, the user 132 may give instructions 134a to a bank service 140 to accept bills 128a coming from the agency 120 and taking care of payment at the collecting center 138 of the agency itself.

On the basis of the information coming from the the collecting center 138, the computer 126 takes further decisions such as reminders, injunctions, orders of service suspensions and like in the case of omitted payments, said decisions being transmitted to a public relations center 142 in the form of messages 144 to be sent to the users 132 through the mail delivery service 130 or as interventions 146 on the same user.

With the system and apparatus according to the present invention the same agency 120 can be reorganized in the following manner indicated in FIG. 4.

The unit counters 122 through the interface system 124 provide data to the central computer 126 by means of which billing messages 128a are periodically issued and sent through a proper "modem" 150 to a telephone line 152 connected to a receiving "modem" 154 at a user which controls a computing and printing unit 156, according to the present invention, by emitting messages 157 on a proper form or paper strip.

To the said receiving "modem" 154 a normal telephone set 158 is also connected, which is useful both for the normal telephone traffic and for the exchange of information between the user and the agency or other organizations, such as the aforesaid bank service 140.

The message 157 relating to the service billings can be controlled by the user which through any suitable means may send timed instructions 160 to the bank service 140, said means possibly consisting of oral messages through the said telephone service 158, written messages composed by means of the keyboard and display assembly 162, or by means of a command for billing data forwarding, which are temporarily recorded in the computing unit 156 by means of a proper key on said keyboard.

As the obvious alternative, in order to take care of the aforesaid payments, the user can make use of the postal account form, issued from the printer 22, at any postal office according to the standard practice. The computer 126, in the case of omitted payments, may inform the public relations center 142, which may send reminders or injunctions messages 144a, or also commands of limitation or suspension of the service which may influence the operation of the apparatus at the user, up to the complete switching off of the same.

A substantially like procedure can be used for other services supplied by an agency dealing with the public, such as agencies supplying electric power, gas, water, etc.

According to a first and simplest embodiment of a system and apparatus according to the present invention, illustrated in the FIG. 5, which can be adopted by an agency 120a, supplying electric power or gas, said agency 120a is also provided with a central computer 126 issuing billing messages 128a to a transmission "modem" 150 which through the telephone line 152, transmits them to a receiving "modem" 154 which is present together with a computing and printing unit 156 as well as a normal telephone set 158 at one user, at which a meter 170 is also present for the measurement of the supplied product or service.

The procedure for the user of the system with the apparatus according to the present invention in the simplified embodiment of FIG. 5 can be the following one.

A periodic time intervals the central computer 126 of the agency 120a releases messages 128b requesting the reading of a meter 170 at the same user.

The user, upon receiving a message 157 requesting a reading, which obviously comes through the telephone line 152, the receiving "modem" 154 and the computing and printing unit 156, then reads the meter 170 and or sends the reading data to the agency 120a using the telephone set 158 or, alternatively, the keyboard and display assembly 162, or by means of an optical reader or analizer for a message written on proper forms, more completely described hereinafter. The agency 120a, upon the reading data being received, takes care of the emission of a billing message 128a following the route and procedure like those illustrated in the embodiment of FIG. 4, including the payment procedures and/or the action to be taken in the case of an omitted payment. According to a more sophisticated version, shown in FIG. 6, the meter 120 at the user is provided with an optical-electronic reader which, through a connection 172, forwards the reading to the computing unit 156 which in turn send them upon request to the central computer 126 of the agency 120a automatically providing it with the reading data.

Upon said reading data being acquired, billing and payment procedure fully similar to those illustrated in FIG. 4 can be followed.

An additional version of the apparatus according to the present invention may include an optical reader of message written on proper forms, such as the reader 34 indicated in FIG. 1, said optical reader being one of many of optical readers consisting of a linear assembly of photo diodes in a charge coupling device, (CCD) comprising suitable electronic computing and coding circuits for the signal, so widespread diffused and known in the field of the opto-electronics.

The forms for the use of said optical reader 34 can be for example of the two types respectively depicted in FIGS. 7 and 8.

The form 180, depicted in FIG. 7, can be used for the writing of a simple communicating message both from an user to service agency 120 or 120a or to bank institutes 140 and between users provided with same apparatus according to the present invention.

Said form 180 is made to slide, for example in the direction of the harrow 182, under said optical reader 34. A pre-marked hatched zone 184 provides to the reader 34 information relating the sliding rate of the sheet and consequently the reading of the characters written in small boxes or casters, with rows 186–192, printed onto said sheet 180.

Alternatively, instead of the pre-market zone 184 a system of small wheels can be used, driven by the paper of the form 180, and actuating pulse generators by which further information on the paper displacing speed is supplied.

As already stated, onto said form communication to the agency, such as data of meter readings, observations and/or message or authorization and payment instruction to bank institute, can be written.

Another form, such as the form 200 depicted in FIG. 8, can be particularly suitable for the request of information to a central agency such as a telephone service or a bank institute. Said form 200 always readeable by means of an optical-electronic reader 34, is compelled to slide in the direction of the arrow 202 under the said reader 34. A pre-marked hatched zone 204 provides to the reader information on the sliding speed on the sheet and thus the of character reading written in the small boxes of the raws 206–210.

As particularly depicted in FIG. 8, this form can be especially suitable to get information from telephone directories or the like, for instance by writing in the first row of small boxes 206 the name and surname or corporation name of a subscriber, in the second row 208 the residing place and in the first row the address street and number, said data being more or less complete, it being meant that in the case of incomplete data the information service would provide, instead the information relating to only one subscriber a list of information of all subscribers having in common the data indicated in the request.

The above described embodiments are only preferable embodiments as an example of the present invention and all the solutions obviously equivalent which may be found by a skilled in the art, upon reading the aforesaid specification are covered.

I claim:

1. In a teleprinting method for periodically transmitting billing data to a user of a meter for measuring service and of allowing the user to control and pay the bill to a supplier of the service at a telephone user, the steps comprising:

collecting service data referred to a service utilized by the user from a user meter associated with a telephone installed at the telephone user to a central processor installed at a supplier location and storing said service data in a memory of said central processor;

processing the service data and a corresponding service rate for the service data stored in the memory of the central processor to obtain a service charge related to a given period of time, including additional charges and taxes;

assembling said service data, service rate and service charge with all other data related to the user and stored in the memory of the central processor and intended to be shown in a bill;

periodically sending through said telephone at the telephone user the assembled data related to the user from the central processor installed at the user location and storing said data in a memory of said remote processor, said assembled data being sent through a communication line;

sending a command from the central processor to the remote processor through said communication line for printing the data stored in said remote processor on a blank bill form available to the user at the supplier location; and printing the blank bill form supplied by the user to a printing machine, the resulting bill form being the document allowing the user to control the billed data and carry out payment for the service received.

2. The method of claim 1, including performing operations of collecting and storing the service data in the central processor through the communication line connecting said central processor with said remote processor in which are stored the service data coming from the meter user.

3. The method of claim 1, including periodically performing the operations of collecting and storing the service data in the central processor.

4. The method of claim 1, further comprising the steps of:

sending a message from the central processor to the remote processor, through said communication line, for signalling inaccuracies of the payment to the user and advices for remedies.

5. The method of claim 1, further comprising the steps of:

sending a message from the remote processor to the central processor, through said communication line, for requesting information, explanations and corrections of at least part of the assembled data.

6. In a method for periodically transmitting an invoice through a telephone system to a user of a meter and a telephone located at the user for measuring service and for allowing the user to control and pay the invoice to a supplier of said service, the steps comprising:

collecting service data referred to a service utilized by the user from a user meter associated with said telephone to a central processor installed at a supplier location and storing said data in a memory of said central processor;

processing the service data and a corresponding service rate stored in the memory of said central processor to obtain a service charge related to a given period of time, including possible additional charges and taxes;

assembling said service data, service rate and service charge with all other data related to the user and stored in the memory of said central processor and intended to be shown in the invoice;

combining said assembled data with a blank invoice form stored in the memory of said central processor to obtain a completed invoice form;

periodically sending, through said telephone system, said completed invoice form to the user from said central processor to a remote processor installed at the user location and storing said completed invoice form in a memory of said remote processor;

periodically sending a command from said central processor to said remote processor, through said telephone system, for printing the completed invoice form stored in the memory of said remote processor, the resulting invoice printed on paper being the document allowing the user to control and carry out payment for the service received.

7. In the method of claim 6, in which said telephone system includes a communication line and operations of collecting and storing the service data in said central processor are made through the communication line connecting said central processor with said remote processor in which are stored the service data coming from the meter user.

8. In the method of claim 6, in which operations of collecting and storing the service data in said central processor are periodically made.

9. In the method of claim 6, wherein said telephone system includes a communication line and further comprising the step of:

sending messages from said central processor to said remote processor, through said communication line, for signalling inaccuracies of the payment to the user and advices for remedies.

10. In the method of claim 6, wherein said telephone system includes a communication line and further comprising the step of:

sending messages from said remote processor to said central processor, through said communication line, for requesting information, explanations and corrections of the invoice.

11. A method for use of a teleprint apparatus at a telephone user site to permit information pertaining to billing and the payments of meter measurable services based on data of meters to relate the measurement of products or services supplied to each user at a user site to a central accounting computer (126) at another site, comprising the steps of:

sending data from said accounting computer through the telephone line (152) to provide a billing message to each user provided with said teleprinting apparatus prior to billing;

sending all data necessary for preparing information pertaining to said billing from the central computer through a receiving modem (154), and a computing and printing unit (156) for printing billing data onto a form (157);

controlling the operation of said printing unit at the site of the telephone user free from access by the user to said printing unit at the user site; and printing with a printer necessary billing data at the user site onto said form (157) by means of said printer.

12. The method according to claim 11, wherein the step of carrying out includes effecting further action using the form (157) with data supplied by said computing and printing unit (156).

13. The method according to claim 11, including transmitting to a remote site using said form (157) with the data issued by said computing and printing unit (156) in a form of different data.

14. The method according to claim 11, including using data produced by said computing and printing unit (156) at the user site for sending data instructions (160) to a remote site (140).

15. The method according to claim 14, including using a keyboard and display assembly (162) for transmitting the data instructions (160) to said remote site (140) through a telephone line using said computing and printing unit (156) and said modem.

16. The method according to claim 14, including writing the instructions (160) onto a communication form (180) and using an optical reader (34) connected to apparatus at the user site to read the communication form.

17. The method according to claim 11, including using counters (122) present at said other site for providing data to the accounting computer (126) for preparation of said billing message, and sending the billing message from said accounting computer (126) to said user site, including sending special disposition (144a) as the parameters of limitation or suspension of service based on particular situations.

18. The method according to claim 11, including using the meter (170) present at the user site and the accounting computer (126) at the other site to send periodic instructions (128b) to the user to read the meter (170) and transmitting the data read from the other site, said accounting computer then sending billing data suitable for the compilation of bills and/or payment forms to the user site, by means of the computing and printing unit (156) at the user site.

19. The method according to claim 11, including using optical readers for directly reading the meter (170) at the user site from the accounting computer (126), and periodically energizing said meter by said computers (126) through an interface (172) between said computers and said calculating and printing unit (156) at the user, and enabling the computer (126) at the other site to send to said user special dispositions (144a) as commands for the limitation or suspension of services owing to a particular situation.

* * * * *